(12) United States Patent
Merrill et al.

(10) Patent No.: US 6,977,060 B1
(45) Date of Patent: Dec. 20, 2005

(54) METHOD FOR MAKING A HIGH TEMPERATURE EROSION RESISTANT COATING AND MATERIAL CONTAINING COMPACTED HOLLOW GEOMETRIC SHAPES

(75) Inventors: Gary Brian Merrill, Monroeville, PA (US); Jay Edgar Lane, Murrysville, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/536,742

(22) Filed: Mar. 28, 2000

(51) Int. Cl.$^7$ ................................. B22F 7/00
(52) U.S. Cl. ........................................ 419/5
(58) Field of Search .................. 264/640, 641, 264/643, 656, 657, 669, 670, 645, 653; 419/8, 419/9, 5, 27, 10

(56) References Cited

U.S. PATENT DOCUMENTS

| | | | |
|---|---|---|---|
| 3,325,341 A | | 6/1967 | Shannon |
| 4,035,545 A | * | 7/1977 | Ivanov et al. ............... 428/328 |
| 4,079,162 A | * | 3/1978 | Metzger ..................... 523/219 |
| 4,130,440 A | * | 12/1978 | Nose et al. ................. 106/627 |
| 4,423,097 A | * | 12/1983 | Mons et al. ................ 427/451 |
| 4,450,184 A | * | 5/1984 | Longo et al. ............ 427/376.4 |
| 4,621,024 A | * | 11/1986 | Wright ....................... 428/404 |
| 4,639,388 A | | 1/1987 | Ainsworth |
| 4,665,794 A | * | 5/1987 | Gerber et al. ............... 89/36.02 |
| 4,775,598 A | | 10/1988 | Jaeckel |
| 4,867,639 A | | 9/1989 | Strangman |
| 4,867,935 A | * | 9/1989 | Morrison, Jr. ........... 156/89.12 |
| 4,916,022 A | | 4/1990 | Solfest et al. |
| 4,940,679 A | * | 7/1990 | Craar et al. .................... 501/96 |
| 4,950,627 A | * | 8/1990 | Tokarz et al. ............... 501/95.1 |
| 5,064,727 A | | 11/1991 | Naik et al. |
| 5,180,285 A | | 1/1993 | Lau |
| 5,397,759 A | * | 3/1995 | Torobin ....................... 502/415 |
| 5,683,825 A | | 11/1997 | Bruce et al. |
| 5,780,146 A | | 7/1998 | Mason et al. |
| 5,849,650 A | * | 12/1998 | Rorabaugh et al. ........... 501/80 |
| 5,985,368 A | * | 11/1999 | Sangeeta et al. .......... 427/376.4 |
| 6,177,186 B1 | * | 1/2001 | Skoog et al. ................ 428/325 |
| 6,177,200 B1 | * | 1/2001 | Maloney ..................... 428/472 |
| 6,197,424 B1 | * | 3/2001 | Morrison et al. ........... 428/402 |
| 6,235,370 B1 | * | 5/2001 | Merrill et al. ............... 428/116 |
| 6,325,958 B1 | * | 12/2001 | Lombardi et al. ............ 264/86 |

FOREIGN PATENT DOCUMENTS

| GB | 1525037 | | 9/1978 |
|---|---|---|---|
| GB | 1448320 | * | 9/1996 |

* cited by examiner

Primary Examiner—Daniel Jenkins

(57) ABSTRACT

A method for making a material system includes the steps of: providing a chamber, placing hollow geometric shapes in the chamber, closing the chamber, evacuating air from the chamber, feeding a binder for the shapes into the evacuated chamber to impregnate the geometric shapes, drying the binder permeated geometric shapes, and heating the hollow shapes and binder to provide a unitary, sintered material system.

13 Claims, 5 Drawing Sheets

METHOD FOR MAKING A HIGH TEMPERATURE EROSION RESISTANT COATING AND MATERIAL CONTAINING COMPACTED HOLLOW GEOMETRIC SHAPES

BACKGROUND OF THE INVENTION

1. Field of the Invention

The present invention relates to a method of making high temperature, erosion resistant coatings used as abradable seals and thermal barrier coatings.

2. Background Information

Most components of combustion turbines are operated at very high temperatures and often require the use of specialized coatings/inserts to protect underlying supporting materials. These specialized coating/inserts include thermal barrier coatings (TBCs), turbine blade tip inserts, and abradable seals disposed opposite the turbine blade tips, as taught in U.S. Pat. No. 5,180,285 (Lau).

Conventional TBCs typically comprise a thin layer of zirconia. In many applications, the coatings must be erosion resistant and must also be abradable. For example, turbine ring seal segments, which fit with tight tolerances against the tips of turbine blades, must withstand erosion and must preferentially wear or abrade in order to reduce damage to the turbine blades, and form a tight seal with the turbine blade. Protective coating system can include several layers including a metallic bond or barrier coating of MCrAlY having an alumina scale and, for example, a columnar yttria stabilized zirconia thermal barrier, as taught in U.S. Pat. No. 4,916,022 (Solfest et al.), which can be further coated by an erosion resistant layer of alumina or silicon carbide, applied by physical vapor deposition techniques, as taught by U.S. Pat. No. 5,683,825 (Bruce et al.).

In U.S. Pat. No. 5,780,146 (Mason et al.), 30 wt. % to 50 wt. % (50 vol. % to 60 vol. %) of hollow alumino silicate or alumina spheres of 400 micrometer to 1800 micrometer diameter, and having a high temperature capability of approximately 1300° C., were used in an aluminum phosphate matrix, for an abradable seal. The seal is used over a ceramic matrix composite shroud segment, which may comprise silicon carbide fibers in an alumina matrix. There hollow spheres were mixed with an aluminum phosphate paste to form a sliarry, followed by molding to the required shape.

Fillers have also been used by Naik et al., in U.S. Pat. No. 5,064,727. There, abradable stationary seal walls, for jet turbine housings which seal opposing, rotating rotor blade tips, have a ceramic core containing from 30 vol. % to 98 vol. % solid ceramic filler, where the ceramic fills a honeycomb wall structure. This is then covered with erosion and corrosion resistant outer layer, which is made porous by uniformly dispersed, finely divided filler. This is apparently applied by a spraying technique. The pores can be filled with ceramic, metal oxide or carbide materials. Fillers mentioned include hollow $ZrO_2.8YO_3$ ceramic spheres and solid $Al_2O_3$, SiC, TiC and BN spheres.

Other abradable honeycomb structures for use in turbines are taught in U.S. Pat. No. 4,867,639 (Strangman). There, low melting fluorides, such as $BaF_2$, are incorporated into a stabilized zirconia or alumina matrix which, in turn, is used to fill a honeycomb shroud lining made of, for example, a metal alloy. The filling becomes molten when the rotating blade tips rub the shroud, and upon resolidification, improve the smoothness of the abraded surface. Ainsworth et al., in U.S. Pat. No. 4,639,388, teaches another variation of reinforced ceramic layers, including a honeycomb matrix for use in a turbine as abradable seals.

In U.S. patent application Ser. No. 09/261,721 (RDM 97-017, Merrill et al., filed on Mar. 3, 1999), a honeycomb structure having open cells was filled, and optionally overlayed, with a material containing hollow ceramic particles embedded in an interconnected ceramic matrix, to provide a composite thermal barrier coating system having superior erosion resistance and abrasion properties for use on combustion turbine components. The hollow particles were preferably spherical and made of zirconia, alumina, mullite, ceria, YAG or the like, having an average particle size of about 200 micrometers (0.2 mm) to 1500 micrometers (1.5 mm). The steady state erosion rate, grams lost/kg erosive impacting media, of this filler was 3.2 g/kg vs. 4.6 to 8.6 g/kg for conventional TBCs. Here, the ceramic matrix comprised an interconnected skeleton binding the hollow spheres together where the hollow spheres were bonded by a network of aluminum phosphate bridging bonds. The matrix was applied as a slurry mixture of hollow particles, filler and binder, which was heated within the honeycomb structure to form a packed interconnecting ceramic matrix with embedded hollow particles. The flowable ceramic filler material was preferably packed into the open cells of the honeycomb using a combination of agitation and manually assisted packing using pushrods or tamping brushes to force pack the hollow spheres into the honeycomb cells ensuring complete filling. Alternate packing methods such as vacuum infiltration, metered doctor blading and similar high volume production methods were also mentioned.

In U.S. patent application Ser. No. 09/267,237 (99E9112US, Merrill et al., filed on Dec. 20, 1999), a material system useful as an erosion resistant layer for turbine applications was described. There, closely packed hollow, geometric shapes, such as hollow spheres were mixed with binder and other particles and bonded together with a matrix material to provide abradable, porous, thermally stable seals, and the like.

However, none of these coatings or seal structures have optimized abradability with erosion resistance and insulating capability, minimized shrinkability and thermal mismatch, provided constrained stabilized porosity and adequate flexibility, and optimized thermal stability at over 1600° C.; all of which characteristics are required of the next generation high temperature turbine TBCs, blade tip coatings and seals. What is needed is a method of making high temperature turbine coatings and composites that fill these requirements.

The present invention has been developed in view of the foregoing, and to address other deficiencies of the prior art.

Therefore, it is one of the main objects of this invention to provide a method making a high temperature, erosion resistant coating and material which is bondable, non-shrinking, abradable, flexible, thermally stable up to at least 1600° C., and which has constrained stabilized porosity and insulating properties, as well as controlled thermal conductivity and thermal expansion properties.

SUMMARY OF THE INVENTION

These and other objects of the invention are accomplished by providing method of making a material system, useful as an erosion resistant high temperature layer, comprising the steps: (1) providing a chamber having top, bottom and side surfaces, (2) opening the chamber and: filling the bottom chamber with a plurality of generally contacting, hollow geometric shapes having a dense wall structure, such that the shapes are close packed with void spaces therebetween and so that a substantial number of the shapes contact at least 1 adjacent other shape, to provide a packed array in the chamber, and feeding a binder material into the chamber so that before drying in step (3) the binder permeates and penetrates to the void spaces, coating the hollow geometric shapes and impregnating and filling substantially all empty space within the chamber (3) drying the binder permeated packed array to form a green material system binding coating on walls of the hollow shapes and within substantially all the void spaces, (4) heating the dried, binder permeated packed array at a temperature and for a time effective to sinter the hollow shapes and binder together to provide a unitary, sintered material system.

This sintered material system can be used alone as a coating or can be applied to a substrate to form a composite. The sintered material system can again be subjected to further impregnation. Preferably, step (2) involves filling the chamber with the shapes (2a), followed by steps (2b) closing the chamber, and (2c) applying a vacuum within the chamber to withdraw air from the void spaces, where feeding the binder material becomes step (2d). The binder material can be a binder solution or a slurry of binder and ultra fine hollow or solid shapes effective to substantially fill the void spaces. Usually, the hollow geometric shapes are hollow ceramic spheres made, for example, of mullite and the like, and the binder material can be, for example, an aluminum phosphate solution.

Preferably, this process first packs the hollow shapes so that there is substantial contact and substantial chains of contacting shapes, and then diffuses a binder through the contacting shapes. This provides a material system having a bonded compacted chain structure of hollow shapes, resulting in a constrained stabilized uniform spherical porosity, having thermal stability and non-shrinking properties at up to a temperature of at least 1600° C. This process allows intimate chain packing not attainable by plasma spraying or other type coating of a homogeneously mixed filler binder composition, and provides for individually formed rather than in-situ formed hollow shapes, allowing control of wall thickness and density of the hollow shape. This method provides a strong yet porous mass with an optimized combination of physical and thermal properties needed in the industry but heretofore not attainable.

Preferably, the geometric shapes are selected from rigid, hollow, essentially closed ceramic spheres and other similar geometric shapes of low aspect ratio, less than 10 and preferably less than 5, such as hollow cylinders and the like. The shapes are "individually formed," defined here as formed separately and stabilized, rather than being formed in situ on a substrate etc. The hollow ceramic shapes have "dense" walls, defined here as having a density from 90% to 100% of theoretical (0% to 10% porous). Because the geometric shapes are independently formed, denser wall formation results, which allows crack deflection and general toughening of the material, as well as allowing stabilization to very high temperatures approaching 1700° C. Hollow spaces between, for example, one diameter of the large geometric shapes can be filled with smaller diameter geometric shapes, to reduce void volume and minimize, consistent with some measure of flexibility, the content of matrix ceramic bonds which help bond the shapes together.

Preferably, there are three dimensional "chains" of hollow shapes, where a substantial number of shapes contact at least 4 to 12, preferably 6 to 10, other shapes. This chain or string-like geometry provides strength and minimizes large void volumes being close to each other. The material system should have some measure of porousness, at least 15 vol. % usually up to a maximum 90 vol. %, preferably 40 vol. % to 70 vol. % for turbine thermal insulating and abradable coatings, and preferably has some randomness of the contacting shapes in its structure. The method of this invention allows such porous shapes having chain structures which, when sintered, are highly friable, while maintaining a low elastic modulus.

BRIEF DESCRIPTION OF THE DRAWINGS

The invention is further illustrated by the following non-limiting drawings, in which.

DETAILED DESCRIPTION OF THE PREFERRED EMBODIMENTS

Figure 1:
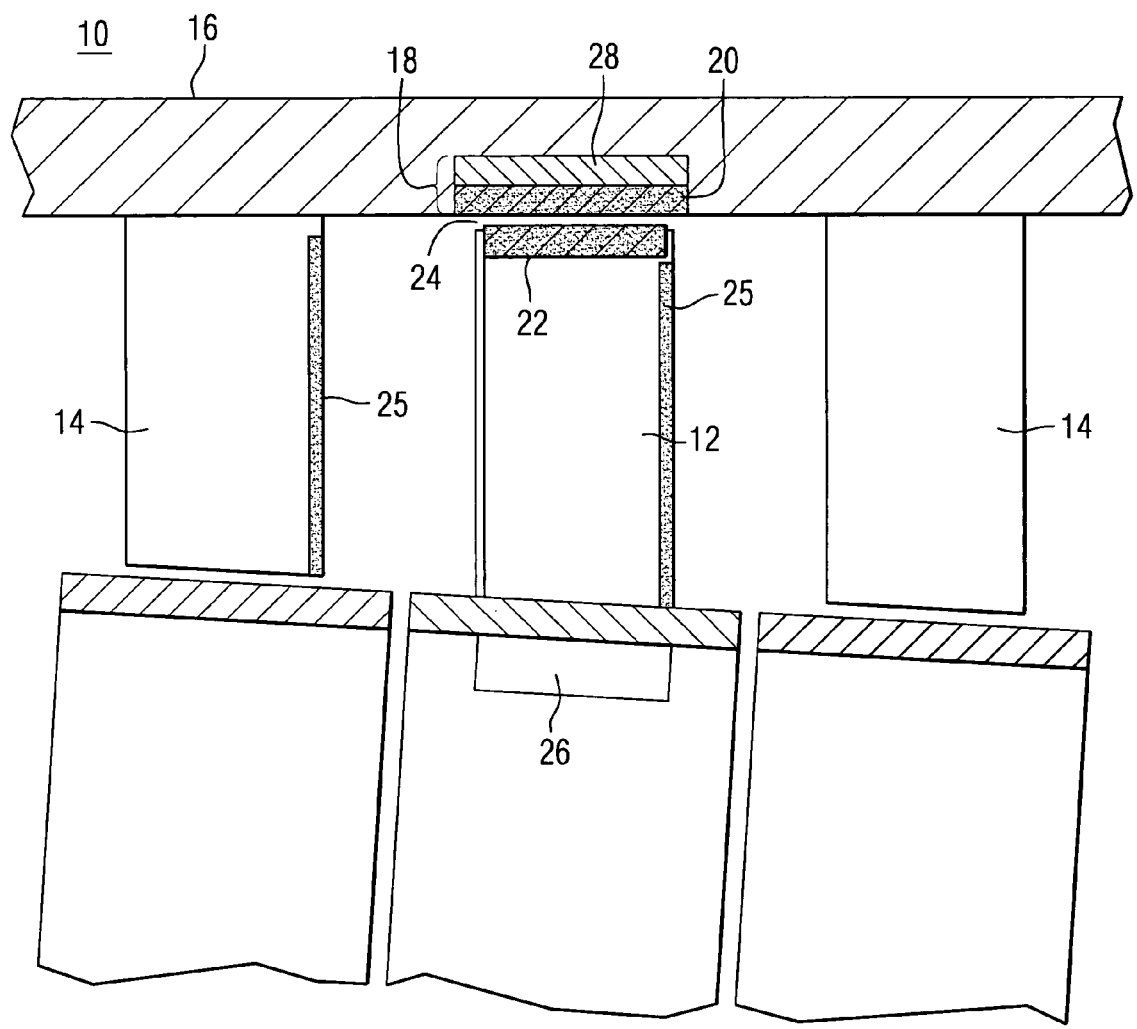
FIG. 1 is a cross-section through a gas turbine shroud and other turbine components in a turbine assembly, showing an abradable seal and a turbine tip, with associated turbine blades and vanes.

Referring now to FIG. 1, a combination of rotatable turbine blades 12 and stationary turbine vanes 14 are shown in a turbine assembly apparatus 10 having a turbine casing 16. Turbine shrouds 18 are arranged circumferentially around one of the stages of the turbine blades and have abradable shroud seal layers 20 which cooperate with the turbine blade tip layer inserts 22 to form a seal area 24, shown wide for the sake of clarity. Blade attachment root 26 is also shown as well as support plate substrate 28 for the seals 20 and potential thermal barrier layer 25 on the turbine blade 12. The vanes 14 are stationary and confine and guide hot gases flowing through the associated gas turbine. Thermal barrier layer 25 could also be used on the vane surfaces. The layer 25 is only shown on the edge but can and usually would cover the entire surface of the blade 12 and vane 14.

In order to improve performance (thermodynamic efficiency and power output), thermal barrier layers have been applied to cooled turbine components to reduce the amount of cooling air, etc., required. Recently, to improve efficiency, the seal leakage area 24 has been reduced by having the blade tip insert 22 contact and abrade the shroud seal 22, to provide individual, tight seals between each seal and its corresponding turbine blade. In this invention the shroud seal, the blade tip insert and most other seal or wear areas in the turbine apparatus can be made of an erosion resistant, filled, high temperature material, made by the method of this invention, utilizing from about 20 vol. % to 85 vol. % of hollow geometric shapes having walls over 70% dense. These same coatings are also useful as a thermal barrier coating for blades, vanes, combustors and other like objects in a gas turbine engine which currently require active cooling.

Figure 2:
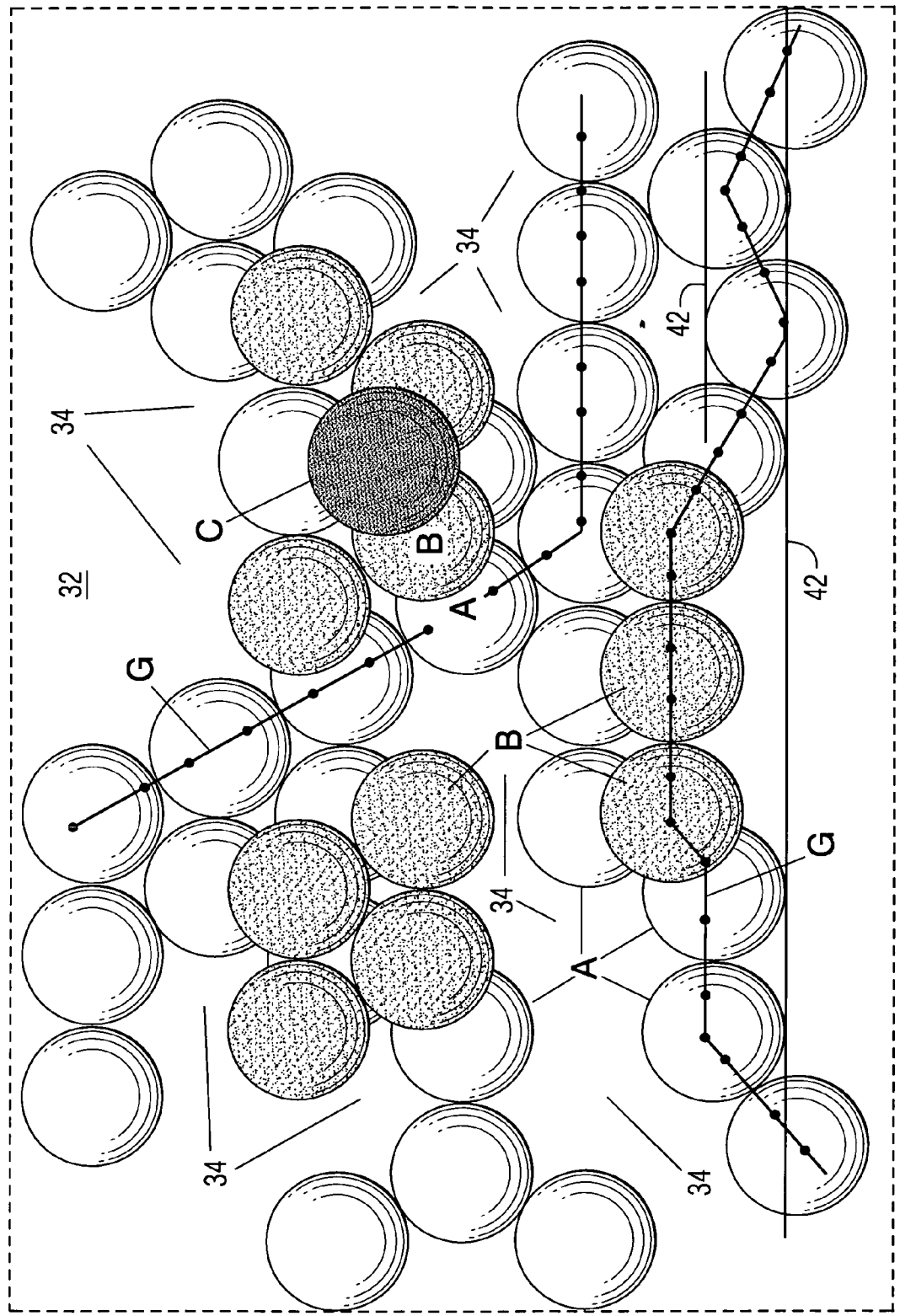
FIG. 2 is a generalized drawing of what one embodiment of the filled, abradable structure made according to the method of this invention, containing about 30 vol. % to 60 vol. % of generally contacting spheres, having coordination numbers of about 3 or 4 to 6, might ideally look like on a microscopic level.
Figure 3:
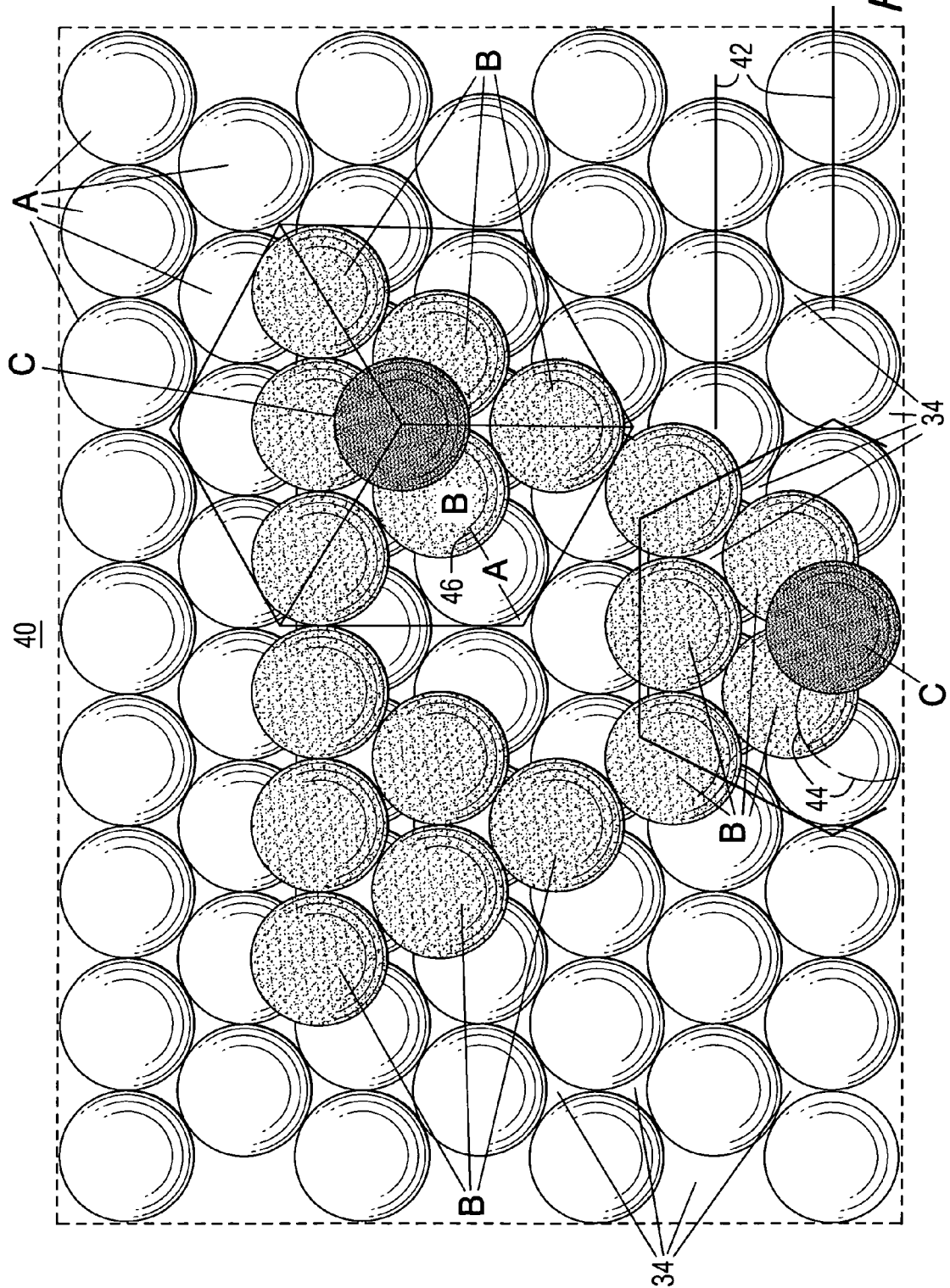
FIG. 3 is a generalized drawing of what the filled, abradable structure made according to the method of this invention containing about 50 vol. % to 90 vol. % of generally contacting, substantially close packed spheres, having coordination numbers of about 5 to 12, might ideally look like on a microscopic level.
Figure 4:
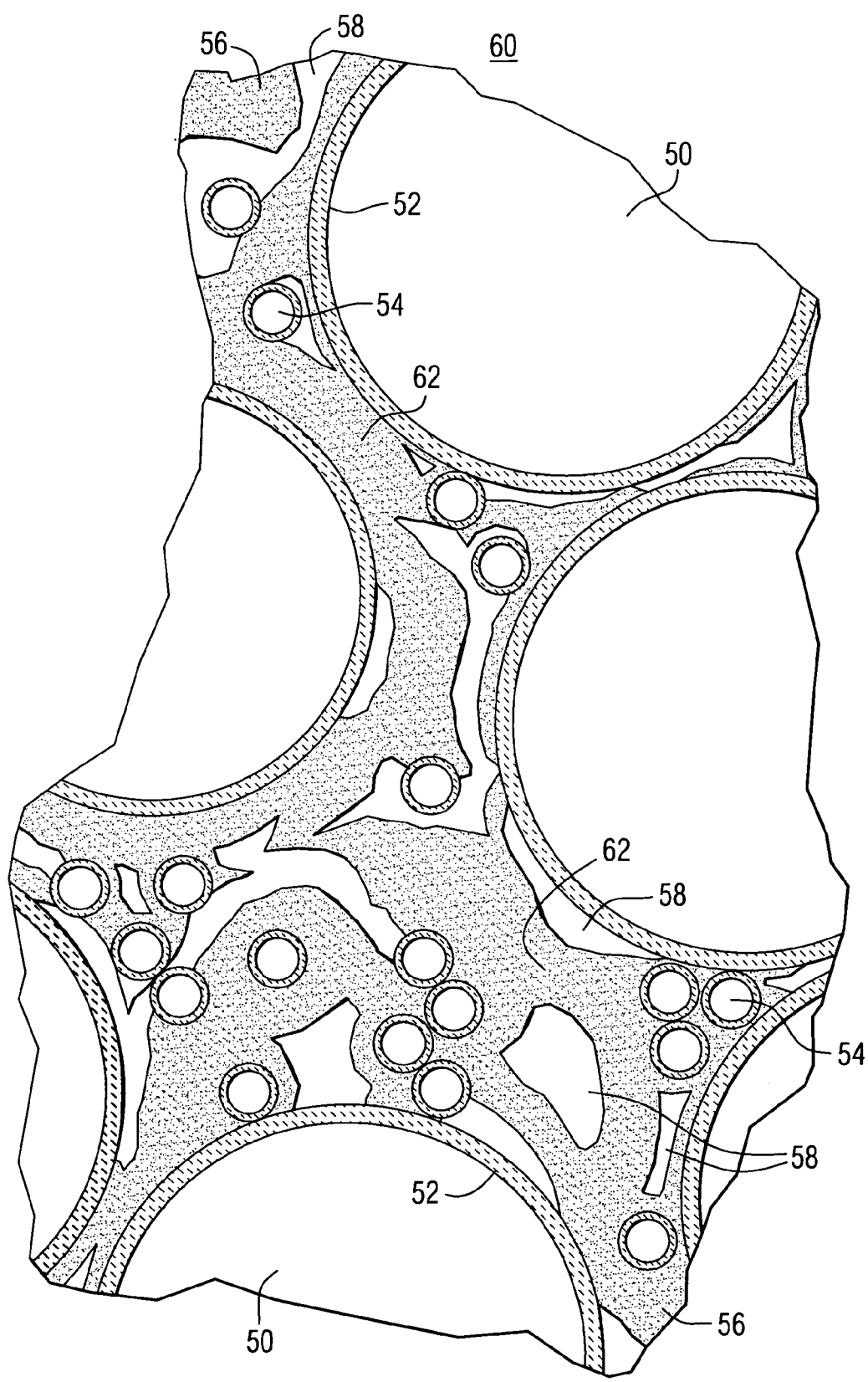
FIG. 4 is an idealized, enlarged view of one part of one layer of the generally contacting close packed structure of FIG. 3, but with lower coordination numbers of from about 6 to 10, and containing hollow spheres.

In FIGS. 2 and 3 the spheres used in the method of this invention are shown as three dimensional bodies, but it is understood that they are hollow shapes, more clearly shown in FIG. 4. Referring to FIG. 2, one example of a material made by the method of this invention is ideally shown as 32, in idealized form, as a segment within the dotted lines. First layer with spheres A is somewhat discontinuous, although most spheres contact at least two other spheres, with a substantial number, that is about 70% contacting three other spheres, which is apparent in locations where the second layer spheres B are shown. Second layer spheres, B are also discontinuous, but with substantial contact with first layer spheres. Only one-third layer, black sphere C is shown for the sake of clarity. The matrix spaces 34 provide moderate porosity in addition to the closed porosity inherent within the hollow geometric shapes. This interstitial porosity is of secondary importance to the overall wear and thermal properties of the structure, but can be critical to the mechanical behavior—especially at the higher porosity range. The erosion performance is achieved through the use of dense-walled geometric shapes which are resistant to small particle erosion. Abradability is likewise achieved through the introduction of course (more than 100 microns), closed porosity. The simultaneous optimization of both erosion resistance and abradability is achieved through judicious selection of the values and scale of closed porosity, hollow sphere size & wall thickness. The contribution of the matrix 34 is primarily in the mechanical integrity of the structure (strength and elastic constants).

Another example of a material made by the method of this invention, shown ideally in FIG. 3, is a close packed array 40, within the segment enclosed by the dotted lines, having generally contacting, mostly continuous, first layer A, mostly continuous second layer B, shown here for sake of simplicity as three clusters, and a mostly continuous top layer, here shown as only two black spheres C, again for clarity. This embodiment has almost universal chain formation in three dimensions, providing a high level of constrained stabilized uniform spherical porosity. That is, the chains prevent collapse and shrinking of the system at temperatures approaching 1700° C. Even though most of the layer B and top layer C spheres are not shown in FIG. 3, it is easy to see how this invention's 50 vol. % to 90 vol. % hollow shape, here hollow sphere configuration, allows minimizing the binder matrix spaces 34. Providing an array, as closely packed as that shown in FIGS. 2 and 3, where the matrix spaces 34 are essentially filled, requires a specialized method of packing and impregnation, as will be detailed later.

By "substantially close packed" is mean the type array shown in FIGS. 2, 3, and 4, where the coordination number, defined previously, is greater than or equal to 1. However, some randomness is desired for maximum fracture toughness, strength and flexibility. FIG. 3 shows two sets of sites for the spheres C of the third layer. A staggered layering as shown by line 44 among spheres A, B, and C, provides a hexagonal close packed array partly shown. A straight layering as shown by line 46 among spheres A, B, and C provides a face centered cubic array.

Referring now to FIG. 4, which more clearly illustrates one product of the method of this invention, hollow spheres 50, having walls 52, are shown, substantially close packed with, optional smaller, embedded, hollow shapes, such as hollow spheres 54, as well as matrix binder material 56 disposed between the larger hollow spheres 50. Voids 58 are also shown. The hollow ceramic spheres 50 are manufactured such that the sphere walls are near 70% to 100% of theoretical density, preferably near 90% to 100% of theoretical density (0% to 10% porous). For good erosion resistance, the wall thickness is preferably between about 100 micrometers to 400 micrometers, depending on sphere diameter. The hollow ceramic spheres uniquely control the dimensional stability of the material system 60 and inhibit gross volumetric shrinkage due to sintering of the matrix-regardless of the matrix binder material selected. The hollow spheres are also critical in establishing the unique macro- and microstructure of the material 60 and in controlling its unique behavior, both thermally and mechanically. The level of closed macroscopic porosity within the material system 60 is defined by the overall size of the hollow ceramic spheres, the wall thickness of the spheres, and their packing arrangement within the structure. The binder that interstitially bonds the hollow ceramic spheres together may also contribute a secondary role to these properties depending on the mechanical and thermal properties and the amount of binder materials used. The structure of the material system 60 imparts unique combinations of properties including, for gas turbine applications, excellent erosion resistance, insulating properties, and abradability in an optimized combination not achieved by conventional means.

The material system 60, shown in FIG. 4, is made by means of the method of this invention with closed macroscopic porosity, via the use of hollow ceramic spheres (or similar geometric shapes) of size ranges between 200 micrometers diameter to 5000 micrometers diameter, which are independently formed and subsequently bonded together to form a macroscopic infrastructure. The bulk density of these spheres 50 themselves is anywhere between 0.1 and 0.9 of theoretical, that is 10% to 90%, taking into account the internal porosity, and depending upon the needs for each high temperature application. The close-packed, contiguous structure defines and controls the thermal and mechanical properties of the system 60 and maintains dimensional stability of the structure. Coordination numbers for the sphere packing can range from 1 to 14, but preferably, the coordination number of substantially all of the hollow shapes is from 5 to 12, and even more ideally from 5 to 8 for gas turbine coating applications. As mentioned previously, some degree of randomness is preferred for maximum fracture toughness and strength. However, idealized packing arrangements and high coordination numbers in the 8 to 14 range, as shown in FIG. 3, may be preferred for stiffness-driven applications such as cores for sandwich structures.

It is critical that the spheres 50 be separately formed and stabilized and then used as such in this method vs. their being formed in-situ. The individually formed and bonded spheres impart unique properties to the material system 60. Contact between dense-walled spheres is not overly intimate due to the binder and possibly smaller included spheres—thus allowing crack deflection and some degree of toughening of the material. Forming the spheres separately allows the stabilization of the spheres to a much higher temperature than otherwise possible. In-situ formed voids, inevitable in most coating operations, are generally interconnected, thus increasing the overall size of critical defects and weakening the structure. By using independently formed hollow spheres, substantially all large voids 50 within the hollow spheres are separated by at least 2× the sphere wall thickness, as shown, for example, at point 62 in FIG. 4. It is also desirable that small voids not be interconnected, but separated as at point 62.

The ceramic hollow spheres such as 50 in FIG. 4 will typically have a wall thickness-to-radius ratio ("t/r" ratio) of between 0.05 to 0.50. Depending upon the application, this "t/r" ratio can vary, for example: for lightweight insulation where erosion is not critical (or is accommodated), t/r in the lower end of this range is desirable; for insulating or abradable coatings, that is, in a gas turbine, where erosion is a concern, t/r between 0.1–0.4 is preferable; for very strong or erosion resistant materials, the higher end of the t/r range is desirable.

For many applications, the absolute value of the wall thickness is critical to achieving adequate erosion resistance. Therefore, the t/r and overall diameter of the spheres must be considered. For example, if a 200 micrometer wall thickness is required for erosion resistance, and the overall bulk density of the material system is defined by abradability requirements, that is, about 60%, this helps narrow down the range of sphere sizes possible (other variables include sphere packing density and matrix density). Wall thickness will generally range from about 0.05 mm (50 micrometers) to 5.0 mm (500 micrometers).

The shape of the hollow particles is ideally spherical, for ease of manufacture and for attaining isotropic properties. However, other similar shapes can be readily made and incorporated in like manner and perhaps introduce certain optimized properties, for example, the shapes can be hollow elongated spheroids or needlelike shapes either randomly oriented or preferentially oriented parallel or perpendicular to the substrate surface and having aspect ratios less than 5-to-1 and lengths between 200 micrometers and 5000 micrometers. Hollow ellipses or other irregular spheroids can be made and indeed are within the normal range of sphere manufacture. Mixtures of spheres, spheroids, low aspect ratio cylinders and other shapes are also natural extensions for use in the method of this invention and, in fact, at least one manufacturing process for hollow spheres also produces hollow, long needle structures. While the invention involves a method of making a material system, it is important to recognize the unique properties and parameters of that system, which are accomplished by the manufacturing techniques which will be detailed shortly.

Overall bulk density of the entire material system made using the method of this invention, including the sphere density, their packing arrangement, and the matrix/filler/binder material is generally in the range of 0.10 to 0.80 of theoretical density, depending on the application. For the example of turbine engine coatings for either insulation or abradability (or both), the range of overall density of the material system and its makeup can vary over a wide range. By controlling the bulk density, that is, sphere size, sphere wall thickness and binder density) of the material system, the properties can be optimized for erosion resistance and/or abradability. The best range for abradable coatings is 30% to 80% theoretical density. The best range for erosion resistance is from about a 0.3 to 0.5 t/r within the 30% to 80% range.

Note that while FIGS. 2, 3 and 4 show cases of regular packing of uniformly sized spheres, the packing of the spheres is not limited to either form or packing nor is it limited to uniformly sized spheres, nor is it limited to any kind of regularity of structure (random packing is more the norm and is allowable so long as the at least substantially "close-packing" criteria is met). Non-uniform sphere sizing may be desirable to achieve higher sphere packing densities.

Sphere walls must be over 70% dense, but are preferably near theoretical density (90% to 100% of theoretical density) to maintain thermal stability over the widest range of temperatures. The high density of the sphere walls imparts excellent erosion resistance and controls the thermal and mechanical behavior of the system. The manufacturing temperature of the hollow spheres is well in excess of the intended use temperature of the material system, for example, mullite ($3Al_2O_3 \cdot 2SiO_2$) hollow spheres can be manufactured at 1750° C., rendering them inert and stable in a material system operating indefinitely at 1600° C. to 1700° C. Separately forming and stabilizing the spheres to high temperatures ensures the thermal and dimensional stability of the system at future high temperature operating ranges up to 1700° C. and possibly beyond. The hollow ceramic spheres, rods, etc. are bonded together interstitially by a ceramic matrix material to form a contiguous and self-supporting structure. The matrix material itself and the interconnected network of spheres both form contiguous structures in the claimed material. The volume content of the matrix material can vary from near zero to completely filling in the interstitial space between the hollow shapes. Preferably the matrix constitutes a minimum of 10% of the interstitial space between the hollow shapes for all coordination members. The matrix content and density are tailored to achieve the desired properties for the specific application, taking into account: the desired bond strength between hollow shapes; the overall bulk density required for abradability purposes; the individual and packing densities of the hollow shapes; permeability requirements; overall mechanical strength of the system; overall thermal conductivity properties desired; and mass considerations (for example, for flight applications). The matrix may or may not contain filler or reinforcing media, including but not limited to, smaller hollow spheres or other geometric shapes, powders, particles, platelets, and whiskers or chopped fibers or other discontinuous fibrous materials. In the case of thick-walled shapes where t/r is greater than 0.25, it may be advantageous to minimize the amount of matrix in the system—so long as the bond strength and other criteria are met. A very strong structure, particularly in compression, can be achieved with very little matrix addition.

The composition of the ceramic hollow shapes can be any oxide or non-oxide ceramic material including (but not limited to) those shown in Table 1 below:

TABLE 1

| OXIDES | CARBIDES | NITRIDES |
| --- | --- | --- |
| Alumina, Silica | SiC, WC, NbC | $Si_3N_4$, TiN |
| Mullite, Zirconia | TaC, HfC, ZrC | SiCN |
| Zircon, YAG, Yttria | TiC | |
| Ceria, Hafnia, Beryllia | | |

The ceramic matrix material may be either of an oxide based or a non-oxide based composition, including (but not limited to) the compositions also shown in Table 1 above.

Typically, high temperature, stable ceramic particulate materials are used in the binder system for the material system. The purpose of these fillers may be to add density to the matrix (without necessarily adding strength), add strength to the matrix, add toughness to the matrix, either via reinforcing or residual stress management, or improve the volumetric yield of matrix infiltrates (cost savings). Typically, the particulate material in the slurry-based binder may be of the composition but not limited to those in Table 2 below, and typical binders are listed in Table 3 below.

| TABLE 2 PARTICULATE | | TABLE 3 BINDER |
|---|---|---|
| Mullite | with | Aluminosilicate/Aluminumphosphate |
| Alumina | with | Aluminumphosphate/ Aluminumoxychloride |
| Zirconia | with | Aluminumorthophosphate |
| Hafnia | with | Aluminumorthophosphate |
| Yttria | with | Aluminumorthophosphate |
| Yttrium Aluminum Garnet (YAG) | with | Aluminumorthophosphate |
| Ceria | with | Aluminumorthophosphate |
| Silicon Carbide or Silicon Nitride | with | Polycarbosilane |
| Hollow Shapes of the Above | with | All Binders Listed Above |

These materials are slowly mixed together, usually with deionized water, to allow good dispersion. An acid, such as nitric acid, may be added to maintain the pH of the slurry infiltration solution in the range of approximately 3 to 4.

Figure 5:
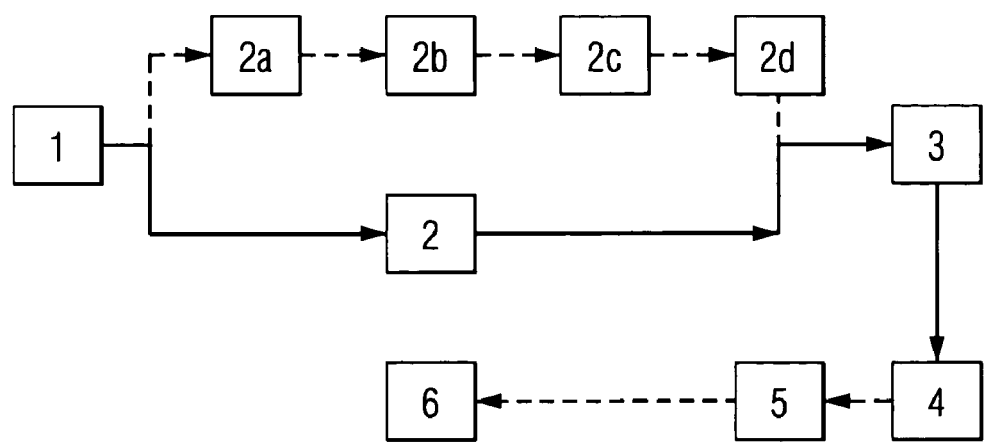
FIG. 5, which best shows the invention, is a block diagram of the method of this invention.

Referring now to FIG. 5, a diagram is shown of the method allowing fabrication of such structures as shown in previously discussed FIGS. 2–4. In the method of this invention, a "chamber" which is meant to include press or mold having a top, bottom and sides, or a similar apparatus, is provided to initially contain either the geometric shapes first or the binder first. In one case, shown by the dotted lines, the geometric shapes are placed into a chamber—step (2a), the chamber is closed—step (2b), preferably air is evacuated—step (2c), thereafter the binder, filled or unfilled, is fed into the evacuated chamber to impregnate the geometric shapes—step (2d), which shapes are substantially close packed, usually as required for the material desired. Usually, a low vacuum is used initially, followed by a higher level of vacuum, to insure complete impregantion of the hollow spheres. For example, the vacuum can start at 1 inch (2.54 cm) Hg and be raised, over a period of several hours, to as high as 35 inches (89 cm) Hg. Total vacuum impregnation may take ten to fifteen hours.

In another case, multiple steps are combined, where the binder is placed in the chamber, after which the shapes are inserted and left to settle, and optionally vibrated into a close packed array; or originally slowly stacked as such an array in the binder—all step (2) shown by a continuous line in FIG. 5. In the first instance (using steps 2a–2d), which is preferred, close packing of the shapes in the array is of prime importance since the shapes are stacked first, before binder is applied. In the second instance (step 2 with continuous lines), complete filling of void spaces within the array is of prime importance since binder may be fed into the chamber first. In both cases there will be good permeation and penetration of the binder into the void spaces. The binder permeated packed array—no mater how accomplished, is then dried—step (3) followed by heating—step (4) and possibly sintering at a stepped temperature rate—step (5) and, optionally, binding to a substrate—step (6). The entire chamber can be heated up to about 80° C., with the impregnated microspheres in place, as an initial heating step to remove excess water during step (3).

To insure that the impregnated microsphere body will not crumble, the chamber with the body intact can be heated to about 400° C. before removing the body from the mold. After the body is removed, it can be further heated, in steps of 2° C. to 10° C. per minute, to 1000° C., to form a secure, unitary structure. To form a true refractory version, the body can be further heated, in steps of 3° C. to 10° C. per minute, to about 1600° C. and held for approximately four to five hours. If desired, the unitary body can also be vacuum infiltrated with a ceramic binder, such as aluminum hydroxyl chloride, with a stepped vacuum up to about 35 inches (89 cm) Hg, followed by heating and firing at temperatures ranging from 1200° C. to 1600° C.

The method of this invention goes beyond phosphate bonding of ceramic hollow spheres using aluminum phosphate and controlled capillary drying of slurry based components to make simple two-dimensional type coatings that could be bonded to a substrate of relatively planar components. This invention is projected for use in complex 3D components such as vane airfoils and combustor liners. This invention provides for the application to complex 3D shapes because it employs alternate binders to bond together the ceramic spheres and filler powders. Specifically, the processing is not based on capillary drying but is rather based on a process of impregnation, preferably under vacuum. The mold forms used can be of any required shape, which means that complex shape forms of these coatings can be produced. This process is more controllable and can also be tailored to provide different coating structures to suit requirements such as erosion resistance and abradability.

Figure 6:
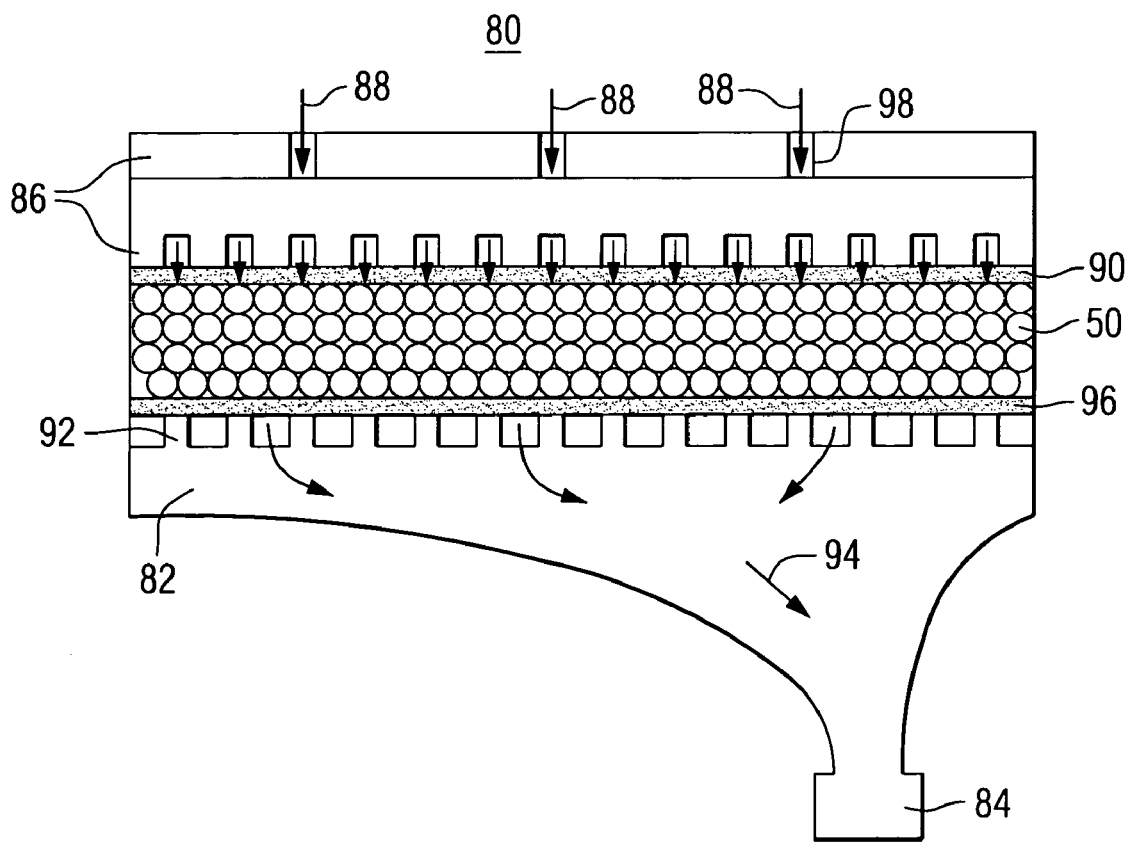
FIG. 6 is a schematic diagram of one embodiment of the vacuum/packing mold that can be used in the method of the invention.

In essence, the process of manufacturing via this invention is based on a process of vacuum impregnation, preferably using an inner and an outer mold as shown in FIG. 6. The inner shell 82 of the chamber 80 is connected to a vacuum system 84 capable of producing pressures to at least 30 mbar. The outer mold 86 consists of a rigid mold shell through which the binder slurry 88 can enter and pass and slowly infiltrate through the already packed spheres 50. Of course, for example, other low profile cylinder shapes or the like could also be used. As is generally shown, the slurry passes through an opening in the top of mold 86, to additional openings in the bottom part of mold 86, and then through spheres 50. At the top surface of the spheres, a porous layer 90 such as plastic meshing is applied to allow mold separation after pressing and filling. The inner mold 82 also consists of a rigid former 92 through which extracted liquid can be removed, as shown by arrow 94, as a result of vacuum impregnation of the particles. In addition to the plastic meshing on this side of the mold, an additional filter layer 96 is required that can effectively prevent any fine particles 54 in FIG. 4, in the slurry from passing through the inner mold. This is typically a filter that does not allow particles 54 to pass through, but does allow the liquid medium to pass through and to go into the vacuum system so that it can be collected. The porous layer 96 that provides for easy separation is plastic based, is typically less than 0.5 mm thick and can be removed easily after infiltration or during partial firing of the entire assembly. The filter 96 is typically made of paper and is less than 0.25 mm thick and will burn away during the firing process leaving no residue.

In operation, impregnation of the spheres 50 is achieved preferably using a water based slurry 88 that can enter through single or plural openings 98. The slurry may consist of a mixture of small particulates and binders, the function of which is to pack as effectively as possible in the spaces between the larger sphere's or cylindrical shape's outer walls. The goal of the impregnation is to fill the interstices of the hollow sphere packed structure with small filler particles after drying. The water (or other specified liquid) is a carrier medium that transports the powder particles from outside the structure into the interior of the hollow sphere compact. The carrier is then removed by the vacuum 84, leaving the solid particles and binder to fill the outer sphere spaces. The amount of slurry required can be calculated as a function of the available intersphere volume. Excess is always preferred to ensure complete filling.

Particle size of any impregnated filler particle can be varied to effect the appropriate packing density required around the larger particles 50. A typical example of this combination could be coarse mullite $3Al_2O_3 \cdot 2SiO_2$) and fine alumina ($Al_2O_3$). The particle size ratio between large to small particles should be in the range of 8:1 to 25:1, preferably 10:1 to 15:1. When very small particles are used (5 micrometers or less), nitric acid may be added to the slurry to enhance separation of the particles in order to provide better rheological properties for more effective infiltration to take place.

As mentioned previously, after impregnation and drying, the body (in green form) may be detooled or partially detooled and dry fired at intermediate temperatures of from about 400° C. to 600° C. to impart some green strength. Subsequently, the green casting may be further infiltrated with a liquid-based binder. This may be completed either under atmospheric pressure or vacuum, depending on the viscosity of the binder. A number of liquid binder solutions can be used to form effective binding of the system. These include monoaluminum phosphate, aluminum hydroxyl chloride and ceramic sols that generate alumina, silica, yttria or zirconia solids. All of these binders dictate different and specific firing schedules. Alternately, a higher temperature firing of the green form can be used to sinter the structure together. This latter will give the most refractory form of the material, but the product will be more brittle. This factor may be important if finish machining is required. It is, however, the intention of this approach to manufacture the coating segments to near net shape and therefore minimize any machining requirements.

Potential applications of this method are to manufacture an insulating coating which can be used on semi-structural ceramic matrix composite components for gas turbines such as transitions, combustor liners, etc., and for insulating coatings for use on structural ceramic matrix composite components such as vanes. Other applications for the material system of this invention may include making materials for application as combustor liners (can, annular, and can-annular configurations), transition ducts, static airfoils and platforms (vanes), seals (both blade tip and interstage), and virtually any static surface exposed to a hot gas path. Aerospace applications include aircraft hot gas (engine exhaust) impinged structures and surfaces; thermal protection systems (TPS) for aerospace vehicles (hypersonic or re-entry protection); stiff, lightweight panels or structures for space systems (satellites, vehicles, stations, etc.), etc. Diesel or other ICE applications include cylinder liners, exhaust ports, header liners, etc.

EXAMPLE

In manufacturing a 10 cm×10 cm×2 cm block of the material system of this invention, the following constituents were used: 400 g of 10 micron mullite powder, KCM Sintered Mullite from Keith Ceramics; 360 cc of deionized water; 70% concentrated nitric acid; 120 g of 0.2 micron alumina powder, AA-61 Alumina from Performance Ceramics Company; and 0.5 to 1.5 mm mullite hollow spheres from Keith Ceramics.

To make the slurry infiltration solution, the mullite powder was added to the water gradually and magnetically stirred for about 10 to 15 minutes, followed by a period of about 30 minutes using an ultrasonic probe, to allow adequate dispersion. Then the concentrated nitric acid was slowly added, drop by drop, to lower the pH of the solution to 3–4. At this pH, the alumina powder was gradually added, and the pH of the solution was controlled by adding drops of the concentrated nitric acid, to maintain the pH at, or just below, 4. The materials were mixed for approximately 30 minutes, to allow the alumina to be finely dispersed in the mullite slurry solution. The slurry solution was then ready for vacuum impregnation.

To vacuum infiltrate a compaction of the hollow mullite ceramic spheres described above, an apparatus similar to that depicted in FIG. 6 was used. The enclosure to be infiltrated was filled with hollow ceramic spheres (shown as 50), which were packed as effectively as possible. Here, the chamber was packed with the hollow ceramic spheres using a vibrating table to shake the spheres into an optimum packing density. Once the spheres were packed into the open chamber, the tooling was bolted together and sealed using rubber seals between all mated surfaces, to ensure an adequate vacuum.

At the vacuum end of the infiltration chamber (shown as 94), a membrane was used which allowed the liquid constituent of the slurry to pass through, but not the solid constituent, which forms the matrix that binds the spheres together. The membrane on the non-vacuum side allowed all constituents of the slurry to pass into the interstices between the packed hollow ceramic spheres.

The slurry infiltration solution was then applied to the chamber through the non-vacuum side and was allowed to saturate the sphere-packed chamber. A minimal vacuum (2.54 cm Hg) was applied, to initiate the matrix packing process. During the next 15 minutes, the vacuum level was gradually raised to 12.7 cm Hg. The vacuum was maintained at this level for 20 minutes. The vacuum was then raised to 17.78 cm Hg and held for a further 30 minutes. After this period, the vacuum was raised, at 2.54 cm Hg per minute, to 30.5 cm Hg and held for a further 10 minutes. Then the vacuum was again raised, at 2.54 cm Hg per minute, to 45.7 cm Hg and held for a further 30 minutes. (More slurry can be added at this stage, if required.) The vacuum was then raised to about 76 cm Hg at about 7.6 cm Hg per minute and held at this maximum vacuum level for about 10 hours. After this period, the tooling was dried in an oven at 60° C. to remove any excess water remaining in the system.

The green body was then placed in a furnace with the metallic tooling and fired at gradually-increasing (2° C. per minute) temperatures to 400° C. and held at this temperature for 2 hours. After this, the green body had sufficient strength to be removed from the tooling and fired, standing alone, at gradually-increasing (2° C. per minute) temperatures to 550° C. It was held for 1 hour, then the temperature was increased, by 7° C. per minute, to 900° C., and it was again held for 2 hours, to form a unitary structure. Then the structure was cooled, at 10° C. per minute, to room temperature and removed from the oven. At this stage, the body has sufficient strength to be carefully handled.

Alternatively, the body can be fired under controlled conditions (5° C. per minute) to 1600° C. and held for 4 hours, to form a refractory version of the structure.

In order to develop full strength, the body structure was infiltrated by aluminum hydroxyl chloride (Keith Ceramics Bonding Agent KCM 2025), acting as a ceramic binding solution. This improved the overall strength of the structure body. Infiltration of the body occurred as follows. The structure body was placed in a vacuum chamber with sufficient binding solution to cover the body. A vacuum was slowly applied to the body to remove any entrapped air that might inhibit effective wetting of the body by the binder solution. The vacuum was applied at the rate of 12.7 cm per minute to 50.8 cm Hg, and then further increased to 76.2 cm Hg at the same rate. When the maximum vacuum was obtained, that level was then held for 2 minutes. After this, the system was allowed to return slowly to atmospheric pressure. The soaked body was then removed and heated under a 200-watt lamp for approximately 8 hours, being turned occasionally to promote consistent drying through the body. After this, the body was fired to 900° C. at 7° C. per minute and held at that temperature for 2 hours, then cooled to room temperature at 10° C. per minute. (This cycle can be repeated up to three times, to obtain maximum strength values.) In the final firing, the temperature was raised to 1200° C., at the same rate (7° C. per minute), to complete the processing of the body with the added binder.

The present invention may be embodied in other forms without departing from the spirit or essential attributes thereof, and accordingly, reference should be made to both the appended claims and the foregoing specification as indicating the scope of the invention.

What is claimed is:

1. A method of making a material system for use at a predetermined use temperature in a high temperature environment, the method comprising:
    forming a plurality of geometric shapes at a manufacturing temperature in excess of the use temperature to render the geometric shapes dimensionally stable at the use temperature;
    filling at least a portion of a chamber with the plurality of geometric shapes such that the geometric shapes define void spaces therebetween and at least a portion of the geometric shapes are not bound to each other when placed into the chamber;
    introducing a slurry comprising a carrier medium and a binder material into the chamber;
    impregnating binder material into the void spaces and removing carrier medium from the chamber by vacuum impregnation to form a green body;
    heating the green body to a processing temperature at which the geometric shapes do not sinter and that is less than the manufacturing temperature to form the material system adapted for use at the use temperature, wherein the forming includes stabilizing the geometric shapes so that the geometric shapes do not sinter to one another at a temperature at which the geometric shapes would sinter together prior to stabilization.

2. The method of claim 1, wherein the geometric shapes are hollow, achieve dimensionally stability by being manufactured at a temperature in excess of 1600° C. and comprise an oxide based composition.

3. The method of claim 1, wherein the binder material comprises an aluminum phosphate based composition.

4. The method of claim 1, wherein the binder material is adhered to the geometric shapes by sintering the binder material to the geometric shapes at a temperature between 400° C. and 1600° C.

5. The method of claim 1, wherein the material system is adapted for use in a combustion turbine engine by utilizing a chamber having a three dimensional shape that forms the material system to be near net shape for one of an airfoil and a combustor liner.

6. The method of claim 1, further comprising introducing the slurry into the chamber through a first opening and applying a vacuum to the chamber through a filter to remove the carrier medium while retaining the binder material within the chamber.

7. The method of claim 1, further comprising applying a first vacuum level to the chamber during a first period of time and applying a second vacuum level greater than the first vacuum level to the chamber during a second period of time.

8. The method of claim 1, further comprising forming the slurry to comprise the carrier medium, the binder material and a filler material.

9. The method of claim 1, further comprising infiltrating aluminum hydroxyl chloride into the green body.

10. The method of claim 1, further comprising forming the geometric shapes to be hollow spheres with sphere walls of 70–100% of theoretical density.

11. The method of claim 1, wherein a majority of the geometric shapes are not bound to each other when placed in the chamber.

12. The method of claim 1, wherein all of the geometric shapes are not bound to each other when placed in the chamber.

13. The method of claim 1, wherein the geometric shapes are spheres.

* * * * *